Nov. 28, 1944.   C. E. REICHERT   2,363,550
DIFFERENTIALLY CONTROLLED SURFACE FOR LATERAL AND DIRECTIONAL CONTROL
Filed Dec. 15, 1941   3 Sheets-Sheet 1
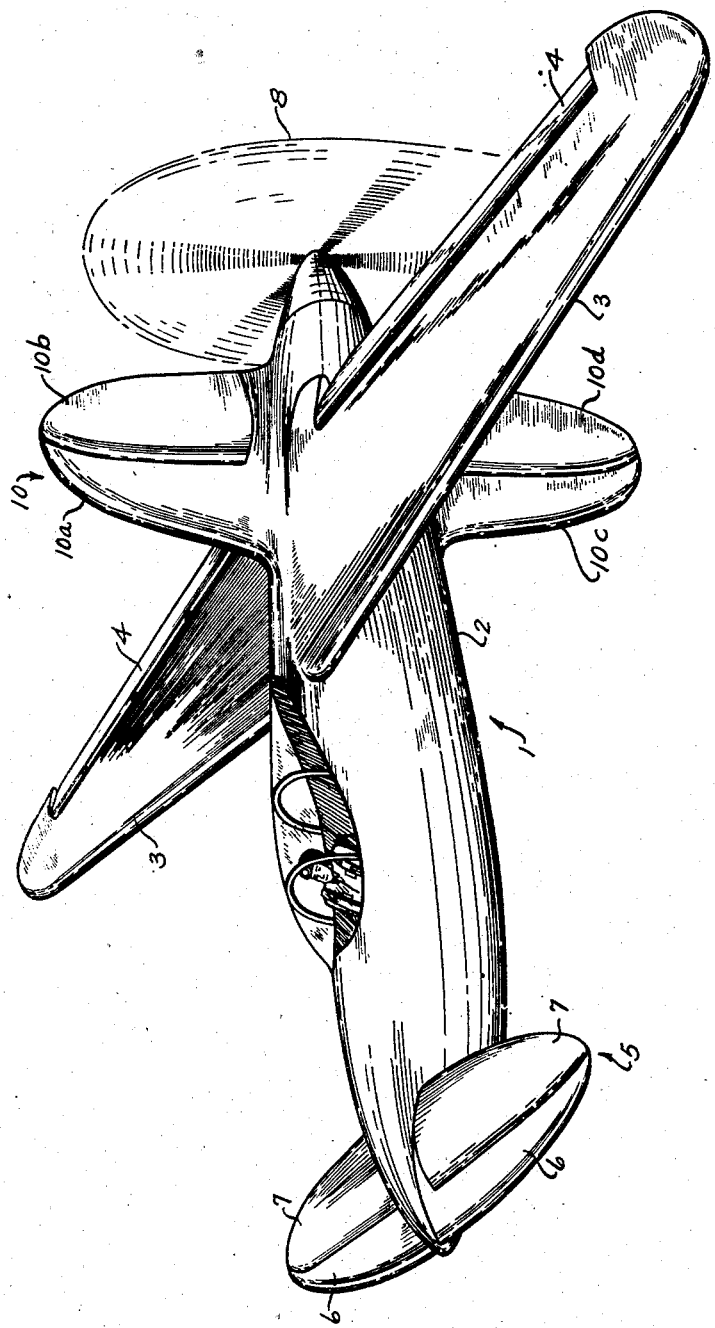

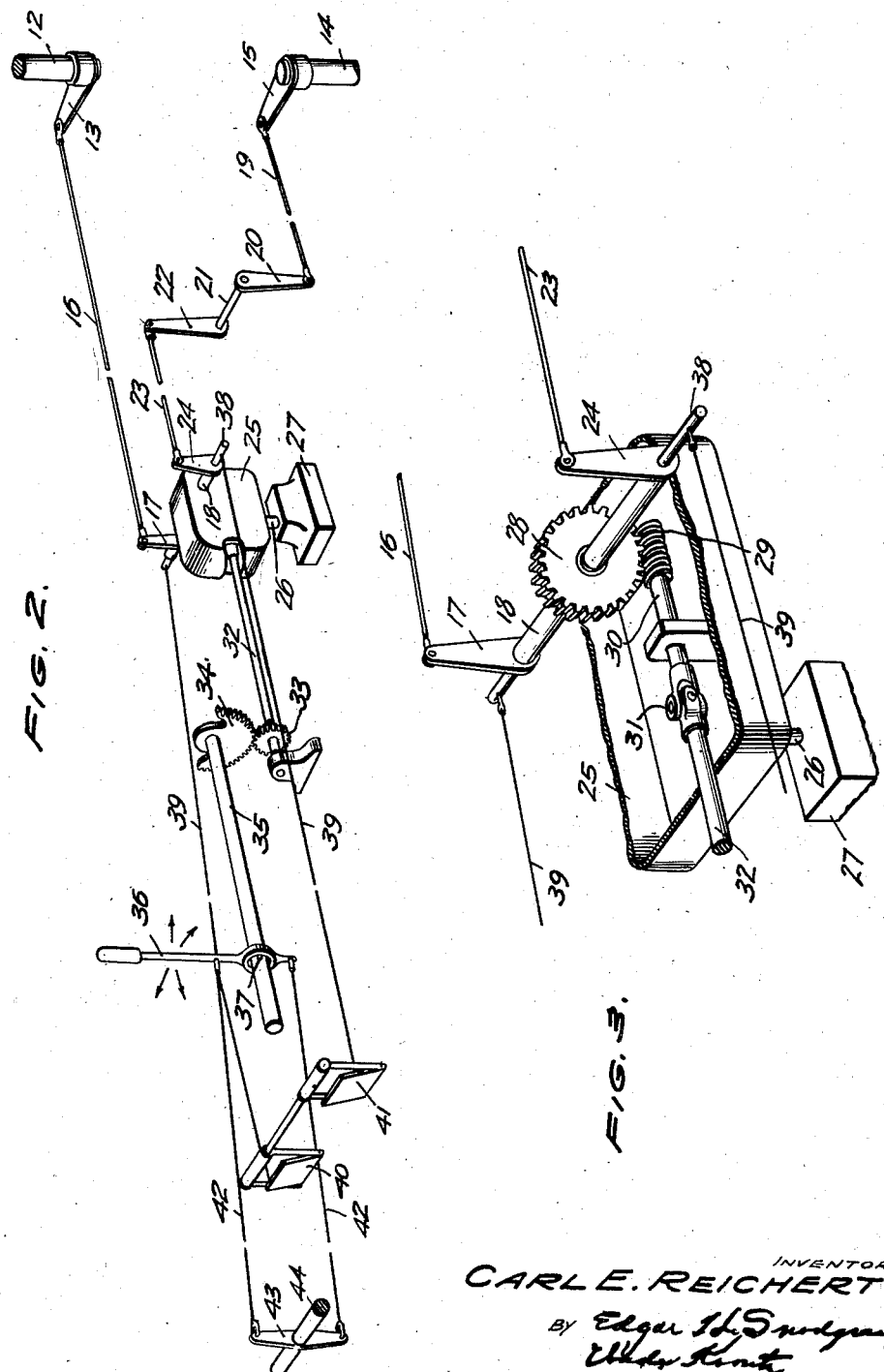

Nov. 28, 1944.      C. E. REICHERT      2,363,550
DIFFERENTIALLY CONTROLLED SURFACE FOR LATERAL AND DIRECTIONAL CONTROL
Filed Dec. 15, 1941      3 Sheets-Sheet 3
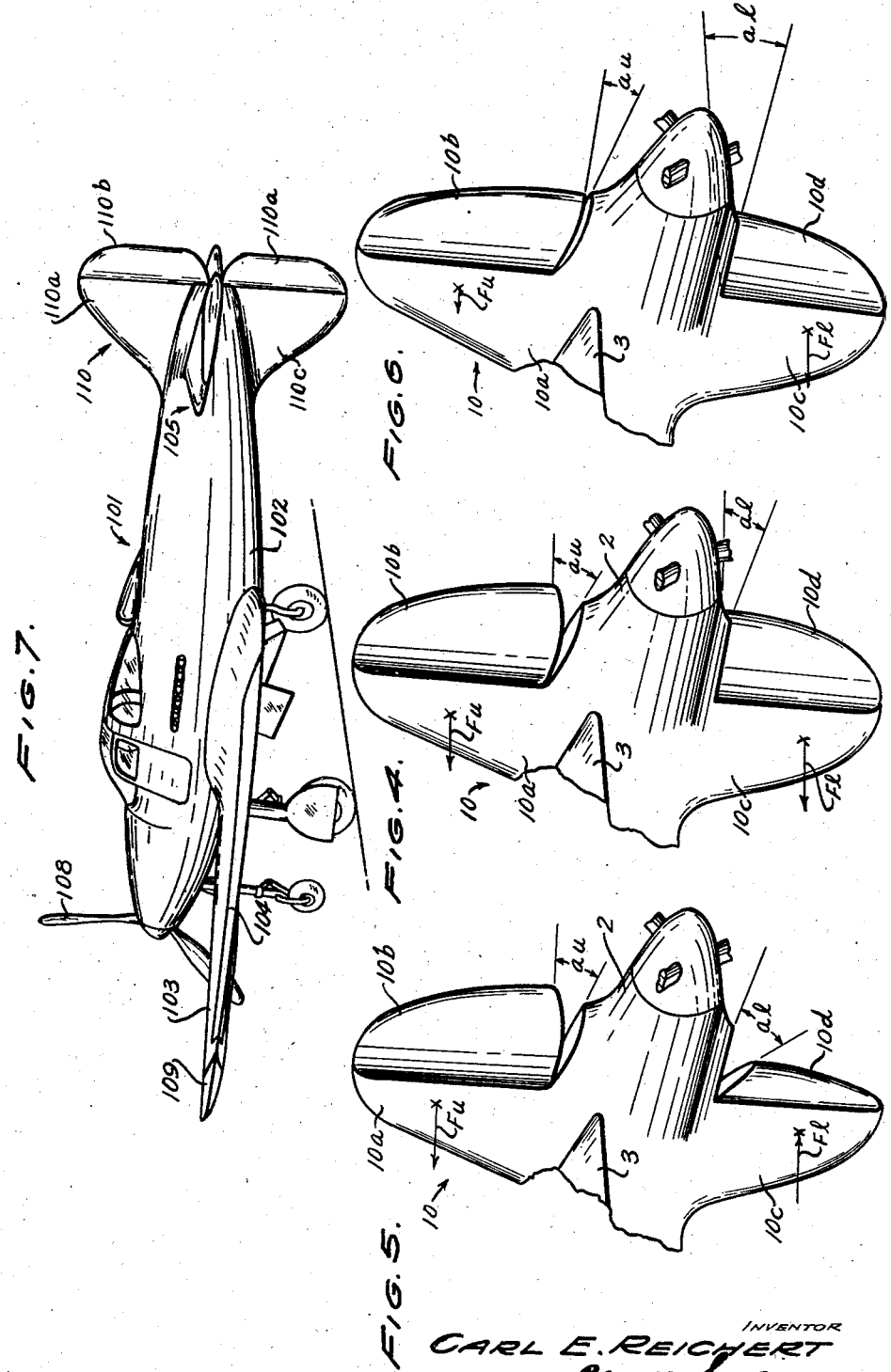
INVENTOR
CARL E. REICHERT
ATTORNEYS Patented Nov. 28, 1944

2,363,550

UNITED STATES PATENT OFFICE 2,363,550

DIFFERENTIALLY CONTROLLED SURFACES FOR LATERAL AND DIRECTIONAL CONTROL

Carl E. Reichert, Dayton, Ohio

Application December 15, 1941, Serial No. 423,075

3 Claims. (Cl. 244—87)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in vertical directional control surfaces for aircraft whereby these surfaces may be utilized also as a means for obtaining rolling moments to thereby assist or wholly supplant the ailerons.

In accordance with the invention, the vertical directional control surfaces comprising a fixed surface and a pair of pivoted control surfaces cooperating therewith are so arranged that the fixed surface or fin area is substantially symmetrically disposed above and below the longitudinal or rolling axis of the airplane and the movable surface area is similarly disposed into two pivoted surfaces which are adapted to be both deflected in the same direction to generate turning moments about a vertical axis, and also adapted to be deflected in opposite directions relative to each other to give an unsymmetrical force distribution with respect to the rolling axis to thereby give rise to rolling moments which are employed for lateral control.

The present invention is particularly well adapted for use with airplanes of the canard, or tail-first, type which have many advantages from a visibility standpoint, particularly in high-speed fighters, but the development of which has been retarded because the very short coupling of the vertical or directional control surfaces necessitates the use of a very large rudder and fin. By employing the directional control surfaces in accordance with the invention, the above-noted disadvantage of the canard airplane is offset by the fact that the vertical surfaces can also be used for lateral control, eliminating the wing-mounted ailerons entirely and making it possible to employ full-span trailing-edge flaps on the wing, which in turn permits a higher wing loading with a resulting increase in speed.

It is also possible, by employing directional control surfaces in accordance with the invention, on airplanes of conventional design, in conjunction with small wing-tip ailerons, to obtain ample lateral control even at stalling speeds and thus make it possible to employ substantially full-span flaps with their attendant advantages.

It is therefore the principal object of the invention to provide vertically arranged directional control surfaces for aircraft, including a fixed surface and at least two cooperating pivoted surfaces, the disposition of the surface area and the operation of the pivoted surfaces being such that the pivoted control surfaces may be employed selectively or simultaneously for directional and lateral control of the aircraft.

It is a further object of the invention to provide a combined lateral and directional control for aircraft, comprising a fixed surface substantially symmetrically disposed above and below the longitudinal or rolling axis of the associated aircraft and a pair of movable surfaces respectively disposed on opposite sides of the said longitudinal axis and control means for deflecting the said movable surfaces in the same direction relative to the fixed surface to obtain directional control and other control means for deflecting said movable surfaces in opposite directions relative to each other to obtain lateral control about the rolling axis of the associated aircraft.

It is a further object of the invention to provide, in combination with a canard type of airplane, a fixed directional control surface of large area substantially symmetrically vertically disposed above and below the rolling axis of the airplane, said surface being located aft of the center of gravity of the airplane, a pair of movable control surfaces pivotally mounted on the fixed surface and respectively symmetrically arranged above and below the rolling axis of the airplane, and control means on the airplane connected to said movable control surfaces whereby said surfaces may be deflected in the same direction relative to the fixed surface to produce directional control forces and adapted to be moved in opposite directions with respect to each other to produce rolling moments about the rolling axis of the airplane to provide lateral control.

Other objects of the invention not specifically enumerated above will become apparent by reference to the detailed description hereinafter given and to the appended drawings, in which:

Fig. 1 illustrates a perspective view of a canard-type airplane incorporating a vertical control surface adapted to serve the dual function of a directional and a lateral control means for the airplane;

Fig. 2 is a schematic view illustrating the control system for actuating the movable surfaces in the combined directional and lateral control of Fig. 1;

Fig. 3 is a fragmentary view illustrating certain details of the control system of Fig. 2;

Fig. 4 is a fragmentary view illustrating the position of the pivoted control surfaces of the airplane of Fig. 1 to obtain turning moments only;

Fig. 5 is a view similar to Fig. 3 showing the position of the pivoted control surfaces to obtain pure rolling moments for lateral control;

Fig. 6 is another view similar to Fig. 3 showing the position of the pivoted flaps for obtaining both directional and lateral control simultaneously; and Fig. 7 is a perspective view of a conventional airplane in which a vertical control surface in accordance with the invention is applied so as to obtain supplementary lateral control.

Referring now to Fig. 1, the reference numeral 1 generally indicates a canard-type, or tail-first, airplane having a fuselage 2 with a lifting surface assembly, generally indicated by reference numeral 5, mounted on its forward end. The lifting surface assembly 5 is, as shown, of the divided type, comprising fixed stabilizer portions 6 and controllable pivoted elevator portions 7, the entire assembly forming what is generally referred to as a lifting tail. The fuselage 2 has connected thereto a main lifting surface or wing 3 situated adjacent the rear portion of the fuselage and having its aerodynamic center located aft of the center of gravity of the airplane as a whole, the wing being provided with substantially full-span flaps 4, which may be employed in the usual manner to increase the lift coefficient during take-off and landing. The engine for supplying propulsive power to the airplane is situated in the rear portion of the fuselage and adapted to drive a pusher propeller 8.

In airplanes of the canard type it is necessary to employ large vertical surfaces to obtain directional control, because of the short lever arm of such surfaces with respect to the center of gravity of the airplane, and in accordance with the invention the vertical control surface assembly generally indicated by the reference numeral 10 is symmetrically disposed above and below the longitudinal center line of the airplane and comprises an upper fixed stabilizer or fin portion 10a and an upper movable portion or rudder 10b, the corresponding lower portions being indicated by the reference characters 10c and 10d respectively. The rudders 10b and 10d are adapted to be deflected in the same direction to produce pure turning moments of the airplane about its center of gravity, as is conventional, but by means of the control system these rudders are also adapted to be moved differentially with respect to each other, whereby rolling moments are produced of a sufficient magnitude to serve as the lateral control means for the airplane and wholly supplant the conventional ailerons, which permits the use of substantially full-span trailing-edge flaps 4, which thereby permits the use of a higher wing loading with its attending advantages in increasing the high speed of the airplane without the ordinary disadvantage of having an excessively high landing speed. The means whereby the rudders 10b and 10d may be controlled, as illustrated in Figs. 2 and 3, will now be described.

Referring now to Fig. 2, the reference numeral 12 indicates a vertically extending torque tube which is employed to deflect the upper pivoted surface or rudder 10b (Fig. 1), the torque tube being provided with an actuating lever 13 adjacent its lower end; and, similarly, a downwardly extending vertical torque tube 14, actuated by a lever 15, is employed to deflect the lower pivoted surface or rudder 10d (Fig. 1). The control lever 13 is connected, by means of a push-pull control rod 16, to a lever 17 mounted on the outer end of a hollow tubular shaft 18. The lever 15 for actuating the torque tube 14 is similarly connected, by means of a push-pull control rod 19, to a lever 20 which is rigidly secured to the outer end of a shaft 21 which is adapted to be supported in suitable bearings (not shown) and provided at its inner end with a lever 22 which is connected by means of a push-pull control rod 23 to a lever 24 mounted on the other end of the hollow tubular shaft 18. As seen in Fig. 2, the hollow tubular shaft 18 is rotatably mounted in a housing 25, which in turn is pivotally mounted by means of a vertical spindle 26 for rotation about the spindle axis, the spindle being suitably supported in bearings carried by a base 27 which is adapted to be secured in any suitable manner to the fuselage structure 2 (Fig. 1).

Referring to Fig. 3, it is seen that the hollow tubular shaft 18 has mounted thereon between its ends a spiral-toothed gear 28 which is adapted to mesh with a worm 29 mounted on a shaft 30 which is suitably supported in bearings secured to the casing 25. At its outer end the shaft 30 is provided with a conventional universal joint 31 to which is connected the inner end of a rock shaft 32 forming a part of the control system. The universal joint 31 permits the housing 25 and hollow shaft 18 to be rotated about the axis of the spindle 26 without interfering with the transmission of rotary motion from the rock shaft 32 through the universal joint 31 to rotate the shaft 30, which in turn, through worm 29 and gear 28, may cause rotation of the shaft 18 about its own axis at the same time that the shaft 18 is being rotated in a plane perpendicular to the axis of the spindle 26.

Referring again to Fig. 2, the rock shaft 32 is adapted to be rotatably mounted in suitable bearings and is provided with a gear 33 adjacent its outer end, which is adapted to mesh with a gear sector 34 carried upon the inner end of a rock shaft 35 adapted to be rotatably mounted in suitable bearings (not shown). The rock shaft 35 has pivotally mounted thereon a conventional control stick 36 which is pivotally mounted as at 37 for free fore and aft movement, while lateral movement of the control stick will produce a corresponding angular rotation of the rock shaft 35 in either direction.

A rod 38 extending through the hollow shaft 18 (see also Fig. 3) and journaled for free rotation thereby, has each of its ends connected, by means of cables 39 or the like, respectively to rudder pedals 40 and 41 so that by deflecting either of the rudder pedals the entire housing 25 will be rotated in a corresponding direction about the axis of spindle 26.

Further, the control column or stick 36 has connected thereto, above and below its pivotal mounting 37, a pair of cables 42 which are pivotally connected to opposite ends of a double-arm lever 43 which is secured to a torque tube 44 adapted to deflect the elevators 7 (Fig. 1) due to fore and aft motion of the control column 36, in a well-known manner.

The operation of the control system, Figs. 2 and 3, to produce lateral control movements of the movable surfaces 10b and 10d (Fig. 1) is as follows: If the rudder pedal 41 is depressed, the cable 39 connected thereto, through the rod 38, will cause a clockwise rotation (looking from above) of the housing 25 about the axis of spindle 26 and cause a corresponding rotation of the tubular shaft 18, which will cause a corresponding rotation of levers 17 and 24 about the spindle axis 26, causing push rod 16 to move backward and, through lever 13, cause a clockwise rotation of torque tube 12 (as seen from above). Similarly, a rotation of the housing 25, through the hollow tube 18 and lever 24, will cause a movement of control rod 23 in a forward direction, which, through lever 22, rock shaft 21, and lever 20, will cause a backward movement of push rod 19, which, through the medium of lever 15, will cause a corresponding clockwise rotation of torque tube 14 (as seen from above); and it is thus seen that by depressing rudder pedal 41, torque tubes 12 and 14 are both rotated in the same sense, which will produce a corresponding equal deflection in the same direction of the rudders or pivoted control surfaces 10b and 10d respectively (Fig. 1). In a similar fashion, depressing rudder pedal 40 will produce a corresponding rotation of torque tubes 12 and 14 in the same direction but in the opposite sense of rotation from that as described above for depressing rudder pedal 41. By means of this control system, depressing rudder pedals 40 and 41 will produce deflection of the rudders 10b and 10d (Fig. 1) in exactly the same manner as in the rudder action of a conventional type directional control as now employed on aircraft.

If the control column 36 is deflected laterally in either direction corresponding to the normal operation of the control column to obtain lateral control through the use of ailerons, torque tube 35 will be rotated in a corresponding direction, which, through gear sector 34 and gear 33, will cause a proportional rotation of the rock shaft 32 in the opposite sense, which rotation, through universal joint 31, will rotate shaft 30 and worm 29, which in turn will cause a rotation of gear 28 and hollow shaft 18 about its pivotal axis. Rotation of the hollow shaft 18 in its bearings in housing 25 will cause levers 17 and 24 to be rotated therewith about the axis of shaft 18 in the same direction so that, for example, if levers 17 and 24 are rotated in a clockwise sense, control rods 16 and 23 will both move backwards, causing clockwise rotation of torque tube 12 (as seen from above) but, due to the reversing action of levers 20 and 22 and rock shaft 21, causing a forward movement of control rod 19 which will produce a counterclockwise rotation of torque tube 14 (as seen from above); that is, the torque tubes 12 and 14, due to lateral motion of the control column 36, will be deflected an equal amount in opposite directions, which in turn will cause an equal and opposite movement of the pivoted control surfaces or rudders 10b and 10d (Fig. 1) due to lateral motion of the control column 36 in either direction from its neutral position. By means of the universal joint 31 (Fig. 3) and a suitable clearance opening for shaft 32 in the housing 25 as seen in Fig. 2, the deflection of the torque tubes 12 and 14 in the same direction due to action of either of the rudder pedals 40 or 41, may be superimposed upon the deflection of the torque tubes 12 and 14 in opposite senses of rotation, due to lateral motion of the control column 36, or either of these deflections may be obtained severally by actuation of the rudder pedals or lateral deflection of the control column alone. The control effects produced on the airplane by actuation of the control system of Figs. 2 and 3 to produce yawing or turning moments as well as the production of rolling moments or lateral control will now be described.

Referring to Fig. 4, if the upper and lower pivoted control surfaces or rudders 10b and 10d respectively, are deflected, for example, through the angles $au$ and $al$ respectively, as a result of depressing rudder pedal 40 (Fig. 2), the angular deflections of the rudders will be both in the same direction relative to the fixed surface elements 10a and 10c respectively and will give rise to lifting forces as indicated by the arrows labeled $Fu$ and $Fl$ respectively, and since the magnitude of the lifting forces will be equal and acting in the same direction with respect to the center of gravity of the airplane as in Fig. 1, a turning moment will be produced which will cause the aircraft of Fig. 1 to turn to the right (looking forward in Fig. 1), this action corresponding identically with the conventional rudder action in an airplane employing a conventional directional control. Similarly, if the rudder pedal 41 of Fig. 2 is depressed, rudders 10b and 10d will be deflected through equal angles and in the opposite direction from that as indicated in Fig. 4, causing the direction of the lifting forces $Fu$ and $Fl$ to be reversed from the direction as seen in Fig. 4, which would correspondingly produce a turning moment on the airplane of Fig. 1 with respect to its center of gravity, causing the airplane to turn to the left (looking forward as seen in Fig. 1).

It is thus apparent that by operation of the rudder pedals 40 or 41 (Fig. 2) the operation of the separate pivoted control surfaces or rudders 10b and 10d produce turning moments on the aircraft in exactly the same manner as the conventional rudder now employed on aircraft.

Referring now to Fig. 5, as has been previously described above with respect to Fig. 2, lateral motion of the control column 36 causes equal and opposite rotation of the torque tubes 12 and 14 which are adapted to deflect the pivoted control surfaces 10b and 10d through equal angles but in the opposite sense of rotation, and if, for example, the control column 36 of Fig. 2 is deflected so as to rotate the rock shaft 35 in a counterclockwise direction (looking forward in Fig. 2), the rudders 10b and 10d of the control surface assembly 10 will move to positions such as indicated in Fig. 5, the rudder elements 10b and 10d being deflected through angles $au$ and $al$ respectively. Movement of the control surfaces 10b and 10d in the manner as described will give rise to lifting forces $Fu$ and $Fl$, as indicated by the arrows in Fig. 5, which will be equal in magnitude but acting in opposite directions at the centers of pressure of the upper and lower fixed surfaces 10a and 10c respectively and, since these lifting forces are acting in opposite directions and are equal in magnitude, they will produce no turning or yawing moments on the airplane about a vertical axis passing through its center of gravity, but, however, these forces produce a couple which will cause rotation of the aircraft about its longitudinal axis, thereby producing rolling moments corresponding to the rolling moments produced by conventional ailerons, the magnitude of the rolling moment being, of course, dependent upon the total area of the control surface assembly 10 and the magnitude of the deflection of the pivoted control surfaces or rudders 10b and 10d for a given lateral movement of the control column 36 (Fig. 2). Lateral motion of the control column 36 (Fig. 2) in the opposite sense will produce respective deflections of the rudders 10b and 10d (Fig. 5) from the position as shown, which will cause a reversal of the direction of the respective lifting forces $Fu$ and $Fl$, which in turn will produce a rolling moment of the opposite sign from that produced by the deflection of the rudders as seen in Fig. 5. It is thus seen that by lateral motion of the control column 36 in either direction from the neutral position, rolling moments are produced which are available for lateral control of the airplane in the same manner as rolling moments are produced by conventional ailerons.

Referring now to Fig. 6, it has been previously described with reference to the control system of Figs. 2 and 3 that the deflection of the torque tubes 12 and 14 produced by the independent action of the rudder pedals 40 or 41 and the lateral deflection of the control column 36 may be superimposed one upon the other without interference and thus make it possible to obtain both turning and rolling moments by a resultant of the separate actions as described with reference to Figs. 4 and 5. As seen in Fig. 6, if the rudder pedal 40 (Fig. 2) was depressed to produce a right turn of the airplane by positioning of the rudder elements 10b and 10d as shown in Fig. 4, and at the same time the control column 36 was deflected laterally to the right (looking forward in Fig. 2) to produce a rolling moment opposite to that as illustrated in Fig. 5, then the net deflection of the upper rudder 10b would be such as to produce only the small angular deflection $au$, which in turn would produce a small lift vector $Fu$. Similarly, the separate deflections of the rudder 10d will be additive to produce a much greater angular deflection thereof as indicated at $al$, which gives rise to a much larger lift vector $Fl$. Since the sum of the horizontal lifting forces $Fu$ and $Fl$ do not equal zero, a turning moment about the center of gravity of the airplane will be produced, and further since the lift vectors $Fu$ and $Fl$ are unequal in magnitude, there will be produced a clockwise rolling moment (looking forward in Fig. 6) which will tend to bank the airplane (Fig. 1) in the proper direction for the turn, and a similar action will take place if the control clumn 36 were moved to the left and rudder pedal 41 were simultaneously depressed, except that the turning moment will be such as to cause a turn to the left of the airplane as seen in Fig. 1, and will correspondingly cause a bank in the proper sense for such a turn.

It is thus seen that by operation of the rudder pedals, turning moments may be produced on the airplane (Fig. 1) corresponding exactly to the conventional rudder control system, that by lateral motion of the control column, pure rolling moments may be produced which give an action equivalent to the action of conventional ailerons, and that by simultaneous operation of either of the rudder control pedals and lateral motion of the control column 36 (Fig. 2) it is possible to obtain both turning moments and rolling moments to control the aircraft in a turn duplicating exactly the combined action on the airplane due to the conventional rudder and ailerons.

By means of the present invention it is thus possible to utilize the large vertical surface area necessary in a canard-type design to give both directional and lateral control and eliminate the conventional ailerons altogether, which permits the use of full-span wing flaps, which will so increase the performance of the canard-type airplane that the objections to such an aircraft will be overcome and the superior advantages of this type of aircraft from a visibility standpoint may be utilized.

While the combined directional and lateral control through the use of vertical surfaces arranged in accordance with the invention makes it possible to overcome certain objections to the canard type of airplane by offsetting its objectionable features by increased performance, control surfaces in accordance with the invention may also be applied to conventional types of airplanes, one example of which is illustrated in Fig. 7, parts equivalent to the elements of Fig. 1 being identified by the same reference numeral plus one hundred. As seen in Fig. 7, the conventional tractor-type monoplane, generally indicated by the reference numeral 101, having a fuselage 102 and monoplane wing 103, may be provided with full-span flaps 104 adapted to be employed in a manner well known in the art to increase the lift coefficient of the wing as a whole during take-off and landing. The airplane is provided with a conventional horizontal tail surface assembly 105 and propelled by a tractor propeller 106. In order to permit the use of the substantially full-span flaps 104, the conventional ailerons usually mounted along the trailing edge of the wing are replaced by wing-tip ailerons 109 of a well-known type which have heretofore not been widely employed because of the inherent stalling tendency thereof, when the airplane is flying at low speeds and at angles close to the stall; and in order to supplement the action of the wing-tip ailerons 109, a vertical tail surface assembly 110 is provided which is identical in arrangement with the vertical control surface assembly 10 of Fig. 1 with the exception that the area thereof need not greatly exceed the area of the vertical tail surfaces now employed with conventional aircraft. Since the vertical tail surfaces are more or less independent of the angle of attack of the airplane as a whole, the operation of the rudders 110b and 110d to produce rolling moments in exactly the same manner as in the airplane of Fig. 1 will supplement the rolling motion produced by the wing-tip ailerons 109 at low speeds and at angles of attack approaching the stall so as to offset the deficient control of such ailerons and make it possible to employ full-span flaps with their attendant advantages. In the airplane of Fig. 7 the wing-tip ailerons 109 may be operated by any conventional means in response to lateral deflection of the control column 36 (Fig. 2) without in any way interfering with the operation of the vertical tail assembly 110 to produce turning and rolling moments in the manner as above described with reference to Figs. 1 to 6 inclusive.

It is obvious that the mode of applying the invention to conventional airplanes such as illustrated in Fig. 7, as a supplementary means for producing rolling moments, will result in a considerable increase in the possible wing loading on such aircraft without its being necessary to employ a higher landing speed than at present, since the manifest advantages of full-span trailing-edge wing flaps may thus be easily obtained.

While I have illustrated a preferred form of the invention and the manner of application thereof, it will become apparent to those skilled in the art that other variations and modifications thereof may be made falling within the scope of the invention as defined by the appended claims.

I claim:

1. A canard-type airplane in which the center of gravity is forward of the aerodynamic center of the main supporting plane and including: a fixed vertical surface located aft of the center of gravity of the airplane and substantially symmetrically disposed above and below the longitudinal or rolling axis of the airplane, a pair of movable control surfaces hinged at the trailing edge of said vertical surface and movable in either direction relative thereto about a vertical axis, and control means on said airplane operatively connected to said movable surfaces to deflect the same, said control means being operative to deflect the said movable surfaces in the same direction to obtain directional control forces to turn the airplane and operative to deflect said surfaces in opposite directions with respect to each other to produce rolling moments for lateral control of the airplane.

2. The structure as claimed in claim 1, in which the control means includes rudder control means effective to displace the said movable control surfaces an equal amount in the same direction and lateral control means operative to deflect said movable control surfaces in opposite directions relative to each other, said rudder and said lateral control means being jointly or severally operative and joint operation causing differential deflection of said movable surfaces.

3. In a canard-type airplane in which the center of gravity is forward of the aerodynamic center of the main supporting plane, a pair of pivotally mounted control surfaces located aft of the center of gravity of the airplane and rotatable in either direction about a vertical axis, said surfaces being symmetrically disposed above and below the longitudinal axis of the airplane and control means within the airplane operative to impart differential movement to said surfaces to cause a lifting reaction which has its resultant eccentrically disposed with respect to the longitudinal axis of the airplane whereby turning moments and rolling moments are simultaneously produced for effecting directional and lateral control of the aircraft.

CARL E. REICHERT.